United States Patent
Ishii

(10) Patent No.: US 9,019,573 B2
(45) Date of Patent: Apr. 28, 2015

(54) IMAGE FORMING APPARATUS, READING APPARATUS, AND CONTROL METHOD OF READING

(71) Applicant: Konica Minolta, Inc., Chiyoda-ku, Tokyo (JP)

(72) Inventor: Hiroshi Ishii, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/140,369

(22) Filed: Dec. 24, 2013

(65) Prior Publication Data

US 2014/0177013 A1 Jun. 26, 2014

(30) Foreign Application Priority Data

Dec. 25, 2012 (JP) ................................. 2012-281002

(51) Int. Cl.
*H04N 1/04* (2006.01)
*H04N 1/407* (2006.01)
*H04N 1/60* (2006.01)

(52) U.S. Cl.
CPC ........... *H04N 1/4078* (2013.01); *H04N 1/6044* (2013.01)

(58) Field of Classification Search
CPC H04N 1/00013; H04N 1/4078; H04N 1/6027
USPC ............... 358/474, 1.13, 1.15, 3.24, 1.9, 461, 358/1.16, 1.2, 3.06, 3.21, 3.27; 399/16; 382/103, 133, 137, 173, 190, 232, 299
See application file for complete search history.

(56) References Cited

U.S. PATENT DOCUMENTS

| | | | | |
|---|---|---|---|---|
| 6,804,473 B2 * | 10/2004 | Nakamura et al. | ............. | 399/16 |
| 6,914,690 B1 * | 7/2005 | Uchida | ........................ | 358/1.14 |
| 7,190,486 B2 * | 3/2007 | Tabata et al. | .................. | 358/1.9 |
| 7,486,414 B2 * | 2/2009 | Arai | .............................. | 358/1.9 |
| 7,701,611 B2 * | 4/2010 | Nakai et al. | .................... | 358/1.9 |
| 8,068,243 B2 * | 11/2011 | Saito | ........................... | 358/1.13 |
| 8,077,358 B2 * | 12/2011 | Banton et al. | ............... | 358/3.24 |
| 8,264,737 B2 * | 9/2012 | Kinoshita | ..................... | 358/1.2 |
| 8,446,633 B2 | 5/2013 | Watanabe | | |
| 8,547,611 B2 * | 10/2013 | Ohkawa | ....................... | 358/518 |
| 8,553,300 B2 * | 10/2013 | Oki | .............................. | 358/504 |

(Continued)

FOREIGN PATENT DOCUMENTS

| | | |
|---|---|---|
| JP | 2001029897 A | 2/2001 |
| JP | 2004-020650 A | 1/2004 |

(Continued)

OTHER PUBLICATIONS

Japanese Office Action dated Nov. 11, 2014, issued in counterpart Japanese Application No. 2012-281002.

*Primary Examiner* — Negussie Worku
(74) *Attorney, Agent, or Firm* — Holtz, Holtz, Goodman & Chick PC

(57) ABSTRACT

In an image forming system including: an image forming section configured to form an image on a sheet; a reading section configured to read the image formed on the sheet by the image forming section; and a control section configured to control image forming by the image forming section and reading by the reading section, the control section determines characteristics on reading of the image formed on the sheet by the reading section depending on an intended use of the image to be read by the reading section.

18 Claims, 9 Drawing Sheets

(56) References Cited

U.S. PATENT DOCUMENTS

| | | | |
|---|---|---|---|
| 2009/0268261 A1* | 10/2009 | Banton et al. | 358/474 |
| 2012/0182566 A1 | 7/2012 | Sawano | |
| 2013/0107301 A1* | 5/2013 | Takagi | 358/1.13 |
| 2013/0215460 A1* | 8/2013 | Eguchi | 358/1.15 |
| 2014/0055814 A1* | 2/2014 | Eguchi | 358/1.15 |
| 2014/0063521 A1* | 3/2014 | Takahata et al. | 358/1.13 |

FOREIGN PATENT DOCUMENTS

| | | |
|---|---|---|
| JP | 2005-223381 A | 8/2005 |
| JP | 2006041902 A | 2/2006 |
| JP | 2009241419 A | 10/2009 |
| JP | 2012039424 A | 2/2012 |

\* cited by examiner

IMAGE FORMING APPARATUS, READING APPARATUS, AND CONTROL METHOD OF READING

BACKGROUND OF THE INVENTION

1. Field of the Invention

The present invention relates to an image forming apparatus, an reading apparatus, and a control method of reading, and in particular to a technique for reading an image on a sheet on which the image is formed, with no waste and with required image quality.

2. Description of Related Art

An reading apparatus is connected on the rear stage of an image forming apparatus for forming an image on a sheet, and constitutes an image forming system. In this image forming system, it is possible to read the image on an sheet on which the image is formed, by the reading apparatus.

In such an image forming system, by referring to the result of reading of the formed image, it is possible to adjust an image forming position, to adjust an image quality, to find a sheet having an inappropriately formed image, to store the image as an evidence of the output of the formed image (image for confirming evidence), and the like.

As such techniques, related inventions are proposed in patent documents including Japanese Laid-Open Patent Application Publication No. 2005-223381 and Japanese Laid-Open Patent Application Publication No. 2004-20650.

In Japanese Laid-Open Patent Application Publication No. 2005-223381, a technique is proposed in which when forming images on both sides, positioning is performed by reading an image-formed sheet with a line sensor and referring to the result of reading.

In Japanese Laid-Open Patent Application Publication No. 2004-20650, a technique is proposed in which a sheet on which a defective image is formed is detected as a defective sheet, and the defective sheet is rejected from output objects by reading an image-formed sheet with an line sensor and referring to the result of the reading.

In addition, besides the above-mentioned patent documents, there is a technique in which an image of each sheet are all stored as evidence so that sheets having images formed thereon were output.

However, no consideration is given about what resolution and gradation to use in the case that the above-mentioned different intended uses simultaneously exist. In other words, it is a common practice in the image forming system that images are read with the same resolution and the same gradation even for different intended uses.

Thus, when the setting is made to satisfy the resolution required for positioning and the gradation required for density adjustment, the reading quality is excessively high for an intended use of an image for confirming evidence. That is to say, the data volume becomes unnecessarily large, and the data may a big burden when storing the data.

On the other hand, when the resolution or gradation is lowered in consideration of the efficiency of storing data, a new problem arises in which positioning are density adjustment cannot be performed with high accuracy.

The image forming apparatus for production print has high image quality, and the apparatus requires high resolution data for positioning. On the other hand, the image forming apparatus for production print has high productivity and performs a large amount of image forming. As a result, the image for confirming evidence needs to store data of many pages.

In other words, the image forming apparatus for production print needs to store data of multiple pages with high resolution. Thus, the data volume produced by reading is increased, and a problem arises in which the data becomes a big burden when storing the data.

An object of the present invention is to realize an image forming apparatus, a reading apparatus, and a control method of reading in which an image on the sheet being discharged with the image formed thereon can be read with no waste and with required image quality.

SUMMARY OF THE INVENTION

An image forming apparatus reflecting an aspect of the present invention, comprising:

an image forming section configured to form an image on a sheet;

a reading section configured to read the image formed on the sheet by the image forming section; and a control section configured to control image forming by the image forming section and reading by the reading section, wherein the control section determines characteristics on the reading of the image formed on the sheet by the reading section, depending on an intended use of the image to be read by the reading section.

A reading apparatus reflecting an aspect of the present invention, is connected on a downstream side of the image forming apparatus for forming an image on a sheet, and configured to read the image on the sheet discharged from the image forming apparatus, the apparatus comprising:

a reading section configured to read the image formed on the sheet by the image forming apparatus, wherein the reading section determines characteristics on reading of the image formed on the sheet by the reading section, depending on an intended use of the image to be read.

A control method, reflecting an aspect of the present invention, of reading an image on a sheet discharged from an image forming section in an image forming system, wherein the image forming system include: the image forming section configured to form the image on the sheet; the reading section configured to read the image formed on the sheet by the image forming section; and a control section configured to control image forming by the image forming section and reading by the reading section, the control method comprising the step of:

the control section determining characteristics when reading the image formed on the sheet by the reading section, depending on an intended use of the image to be read.

Here, when the intended use is adjustment of the image forming section, the control section preferably sets the characteristics to be high resolution or high gradation, and when the intended use is image confirmation, the control section preferably sets the characteristics to be low-to-medium resolution or low gradation.

Here, the image forming apparatus or the image forming system preferably comprises a processing section configured to change resolution and gradation, wherein when a plurality of intended uses are set, the control section controls the reading section to read the image with a setting which has a higher value of a plurality of values, and the control section controls the processing section to process the read image to generate an image with a setting as the characteristics which has a lower value of the plurality of values.

Here, the image forming apparatus or the image forming system preferably comprises a processing section configured to change resolution and gradation, wherein when the intended use is image confirmation and adjustment of color or density of the image forming section, the control section controls the reading section to read with low resolution and high gradation as the characteristics, and the control section controls the processing section to generate an image for confirmation with low resolution and low gradation and an image for adjustment with low resolution and high gradation from the image read with low resolution and high gradation.

Here, the image forming apparatus or the image forming system preferably comprises a processing section configured to change resolution and gradation, wherein when the intended use is image confirmation and adjustment of an image forming position of the image forming section, the control section controls the reading section to read with high resolution and high gradation as the characteristics, and the control section controls the processing section to generate an image for confirmation with low resolution and low gradation and an image for adjustment with high resolution and high gradation from the image read with high resolution and high gradation.

Here, the control section preferably controls the processing section to generate the image for adjustment limited to a partial area from the image read by the reading section.

Here, an image accumulation section is preferably provided to store an image, wherein the control section controls to store the image depending on the intended use in the image accumulation section.

DETAILED DESCRIPTION OF THE PREFERRED EMBODIMENT

With reference to the drawings, there will be described in detail below an embodiment in which an image on a sheet is read with no waste and with required image quality, which sheet is discharged with the image formed thereon by an image forming apparatus or an image forming system.
[Configuration]

Figure 1:
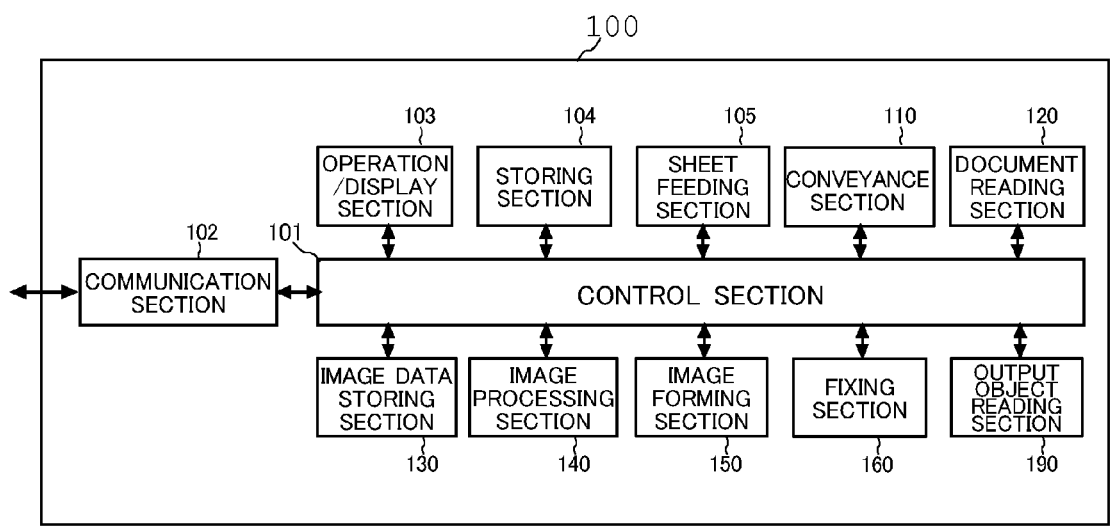
FIG. 1 is a configuration diagram showing a configuration of an embodiment of the present invention.
Figure 2:
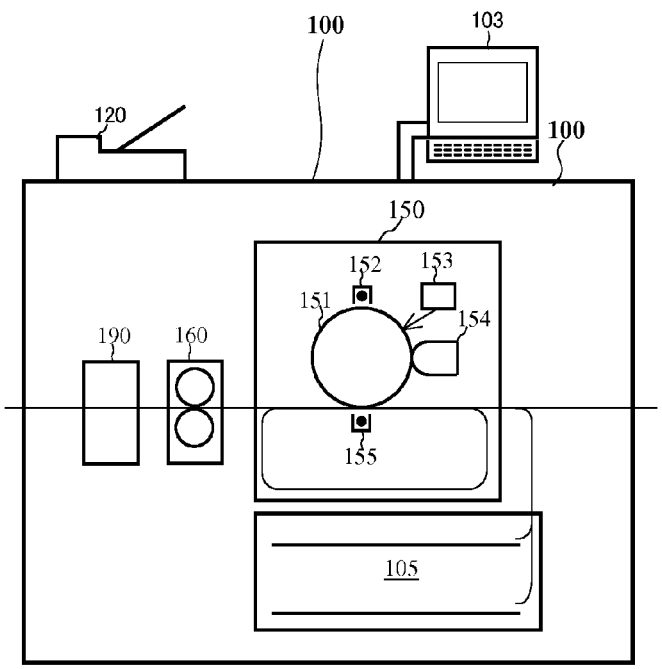
FIG. 2 is a configuration diagram showing a configuration of an embodiment of the present invention.

A first structural example of an image forming system will be described in detail here with reference to FIG. 1 and FIG. 2. Referring to FIG. 1 and FIG. 2, an image forming apparatus 100 having therein a reading section will be described. The image forming apparatus 100 is equipped with a control section 101, a communication section 102, an operation/display section 103, a storing section 104, a sheet feeding section 105, a conveyance section 110, a document reading section 120, an image data storing section 130, an image processing section 140, an image forming section 150, a fixing section 160, and an output object reading section 190.

The control section 101 controls different parts in the image forming apparatus 100. The communication section 102 communicates with other devices connected thereto under control of the control section 101. The operation/display section 103 receives an operation input of a user and displays a state of the image forming apparatus 100. The storing section 104 stores different setting data under the control of the control section 101. The sheet feeding section 105 feeds sheets stored in a sheet supply tray to the image forming section 150. The conveyance section 110 conveys the sheet in the image forming apparatus. The document reading section 120 reads a document to generate image data. The image data storing section 130 is an image accumulation section for storing image data for forming an image under the control of the control section 101 and different data. The image processing section 140 executes different types of image processing needed for forming an image. The image forming section 150 forms an image on a sheet based on an instruction of image forming and image data. The fixing section 160 stabilizes with heat and pressure an image formed on a sheet with toner by the image forming section 150. The output object reading section 190 reads an image formed on a sheet to generate image data.

The image forming section 150 is equipped with an image carrier 151, charging section 152, an exposure section 153, a development section 154, and a transfer section 155 as shown in FIG. 2. On a surface of the image carrier 151, an electrostatic latent image and a toner image are formed. The charging section 152 charges the image carrier 151 to a predetermined potential. The exposure section 153 forms an electrostatic latent image on the charged image carrier 151 by exposing in accordance with image data. The development section 154 develops the electrostatic latent image on a surface of the image carrier 151 to form a toner image. The transfer section 155 transfers the toner image on the image carrier 151 to a sheet.

Here, the output object reading section 190 is disposed on the downstream side in a sheet conveyance direction of the fixing section 160 so as to read an image on a discharged sheet while the sheet is being conveyed.

A cooling device may be provided between the fixing section 160 and the output object reading section 190 to cool the sheet heated for fixing.

Figure 3:
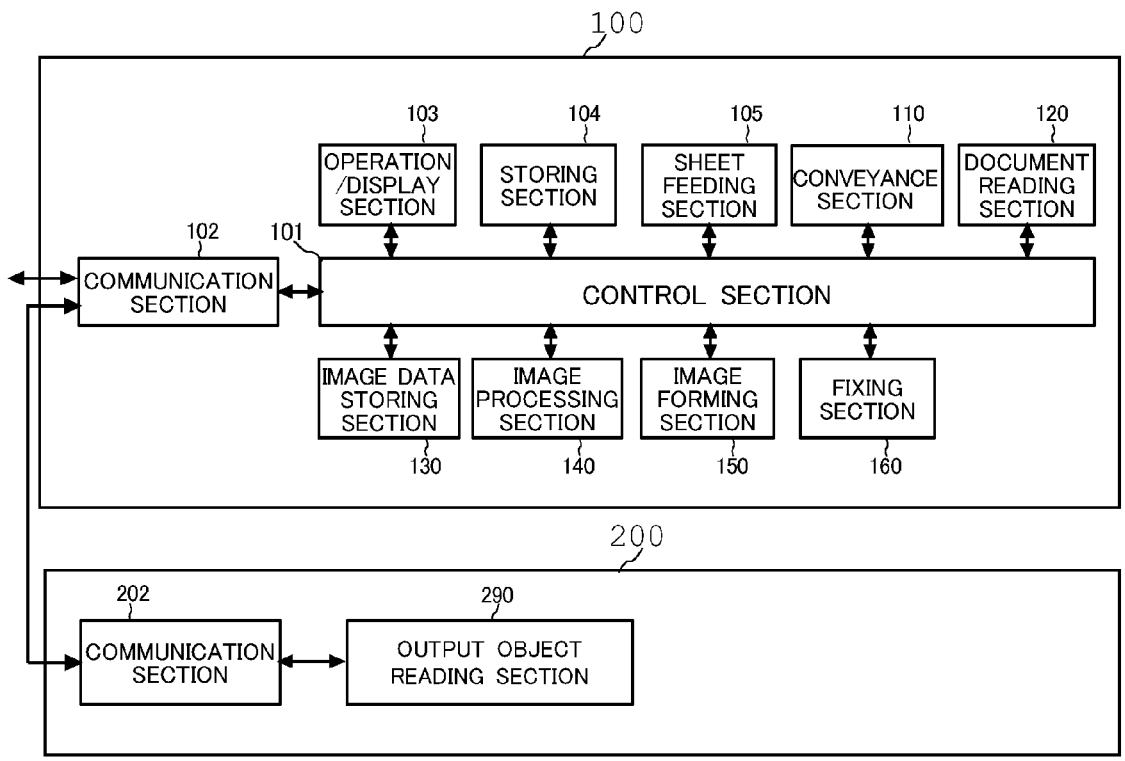
FIG. 3 is a configuration diagram showing a configuration of an embodiment of the present invention.
Figure 4:
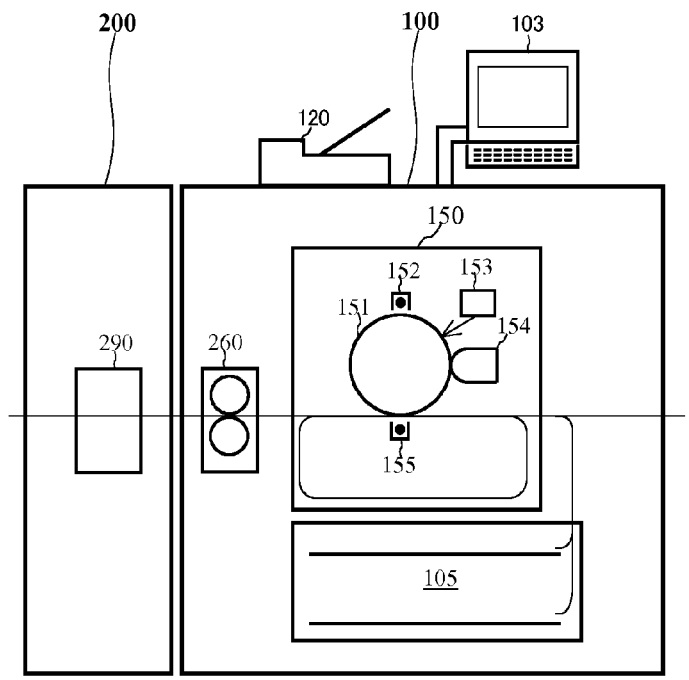
FIG. 4 is a configuration diagram showing a configuration of an embodiment of the present invention.

Here, a second structural example of the image forming system will be described in detail with reference to FIG. 3 and FIG. 4. Referring to FIG. 3 and FIG. 4, an image forming system having an image forming apparatus 100 and a reading apparatus 200 will be described.

The image forming apparatus 100 is similar to one shown in FIGS. 1 and 2, but has no output reading section. In FIGS. 1-2 and FIGS. 3-4, the same reference numeral is assigned to the same component, and a duplicated description will be omitted.

In FIGS. 3 and 4, the reading apparatus 200 is disposed on the downstream side in the sheet conveyance direction of the image forming apparatus 100. The reading apparatus 200 is equipped with a communication section 202 and an output object reading section 290. The output object reading section 290 reads an image formed on a sheet by the image forming apparatus 100 while the sheet is being conveyed.

The reading apparatus 200 may be configured as a rear unit of the image forming apparatus 100, and a fixing section 160 may be built in the rear unit. A cooling device may be provided between the fixing section 160 and the output object reading section 190 or 290 to cool the sheet heated for fixing.

Figure 5:
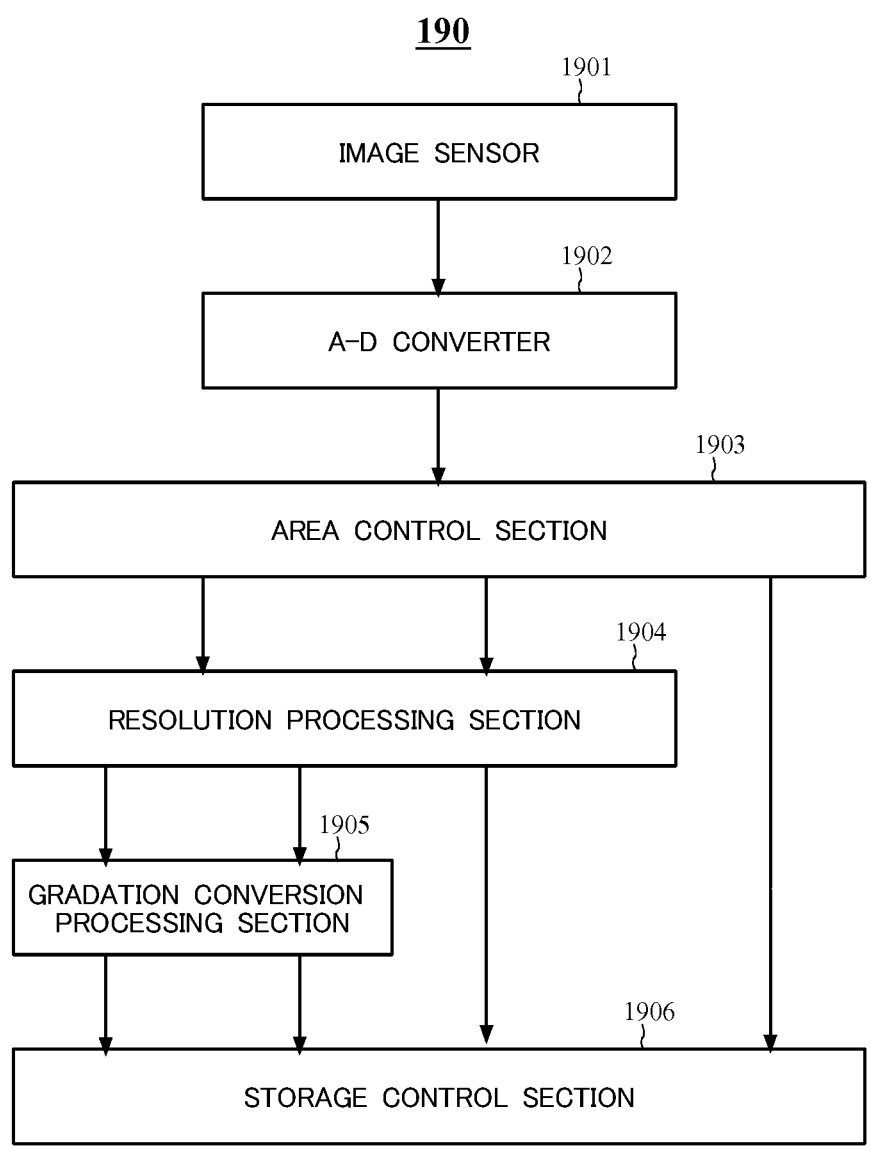
FIG. 5 is a configuration diagram showing a configuration of an embodiment of the present invention.

Referring to FIG. 5, a schematic configuration of the output object reading section 190 will be described here. The output object reading section 190 is configured with an image sensor 1901, an A-D converter 1902, an area control section 1903, a resolution processing section 1904, a gradation conversion processing section 1905, and a storage control section 1906.

The image sensor 1901 is configured with a line sensor whose longitudinal direction is in a direction perpendicular to the sheet conveyance direction. The A-D converter 1902 A-D converts an output of the image sensor 1901. The area control section 1903 limits a reading area or an image data area to a partial area, and generates a trimming image. The resolution processing section 1904 thins out pixels of the image obtained by reading to generate a medium resolution image or a low resolution image whose resolution has been reduced. The gradation conversion processing section 1905 converts the number of bits per one pixel of the image obtained by reading to generated a low gradation image whose gradation characteristics have been reduced. The storage control section 1906 controls storage of different types of generated images, depending on intended uses.

Figure 6:
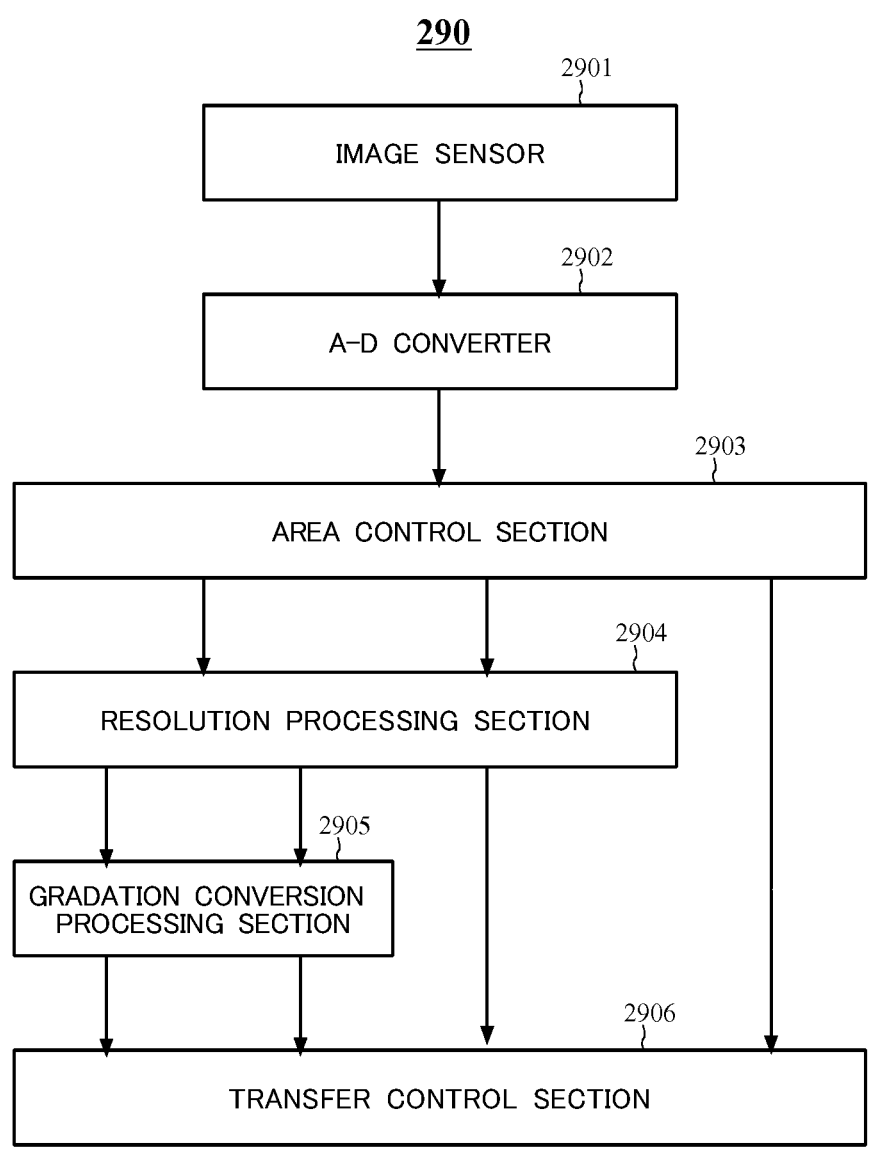
FIG. 6 is a configuration diagram showing a configuration of an embodiment of the present invention.

Further, with reference to FIG. 6, a schematic configuration of an output object reading section 290 will be descried. The output object reading section 290 is configured with an image sensor 2901, an A-D converter 2902, an area control section 2903, a resolution processing section 2904, a gradation conversion processing section 2905, and a transfer control section 2906.

The image sensor 2901 is configured with a line sensor whose longitudinal direction is in a direction perpendicular to the sheet conveyance direction. The A-D converter 2902 A-D converts an output of the image sensor 2901. The area control section 2903 limits a reading area or an image data area to a partial area. The resolution processing section 2904 thins out the pixels of the image obtained by reading to generate a medium resolution image or a low resolution image whose resolution has been lowered. The gradation conversion processing section 2905 converts the number of bits per one pixel of the image obtained by reading to generate a low gradation image whose gradation characteristics have been reduced. The transfer control section 2906 controls transfer of different types of generated image to the image forming apparatus 100, depending on intended uses. In addition, in the case of an image forming system having a sheet processing device (not shown in the drawing) connected on the rear stage of the image forming apparatus 100, it may be possible to dispose the reading apparatus 200 on a sheet conveyance path inside the sheet processing device.

Although the area control, the resolution processing, and the gradation conversion are different units in FIG. 5 and FIG. 6, these units can be realized by one image processing processor. Although the area control, the resolution processing, and the gradation conversion are different units in FIG. 5 and FIG. 6, these units also can be realized by one image processing software instead of only hardware.

In FIG. 5 and FIG. 6, for example, settings for an image for positioning may be set as resolution=600 dpi and gradation=8 bits as a high resolution and high gradation setting. Here, the positioning refers to an adjustment of a position of an image formed on a sheet by the image forming section 150.

On the other hand, the settings for an image for density adjustment may be set as resolution=200 dpi and gradation=8 bits as a low resolution and high gradation setting. Here, the density adjustment refers to an adjustment of density of an image formed on a sheet by the image forming section 150.

The settings for an image for defect check may be set as resolution=300 to 400 dpi and gradation=1 bit as a medium resolution and low gradation setting, depending on an accuracy of defective image detection. Alternatively, the settings for the image for defect check, in another example, may be set as resolution=300 to 400 dpi and gradation=8 as the medium resolution and high gradation setting. Here, the defective image detection refers to a detection of inclination of an image or wrinkles created in the sheet, by using the image for defect check.

The settings for an image for confirming evidence may be set as resolution=200 dpi and gradation=1 bit as a low resolution and low gradation setting. Here, the confirming evidence refers to a confirmation of whether the sheet is output with an image formed thereon, by using the image for confirming evidence.

It should be noted that the output object reading sections 190 and 290 in FIGS. 5 and 6 may read an image in a predetermined area, with a predetermined resolution, and with predetermined gradation characteristics. However, as described later, the output object reading section 190 can generate, from an image read with higher-level settings, an image on a lower-level side (partial area, low-to-medium resolution, and low gradation) with respect to an area, a resolution, and gradation characteristics. These characteristics will be described in detail in the following description of operation.

In the output object reading sections 190 and 290, in the case that a linear CCD image sensor whose longitudinal direction is in the main scanning direction is used as the image sensor, a resolution in the main scanning direction can be changed by making a reading cycle in a timing generator (TG) for reading be variable.

Further, in the output object reading sections 190 and 290, the resolution in sub-scanning direction depends on a conveyance speed of the sheet and a reading speed per one line. In such a case, the resolution in the sub-scanning direction can be lowered to 300 dpi or 200 dpi by averaging two or three lines while the setting is done so as to enable the high resolution reading (for example, 600 dpi) in the sub-scanning direction with respect to a normal conveyance speed of sheet.

Alternatively, if it is possible to change the sheet conveyance speed when the sheet is passing through the output object reading section 190 or 290 after passing through the fixing section 160, the resolution of the sub-scanning direction can be changed also by changing the sheet conveyance speed. Further, not only the gradation conversion process, but the change in resolution can be performed by an image processing.

[Operation]

With reference to a flow chart of FIG. 7 and explanatory diagrams of the FIG. 8 and the later figures, operations of the image forming apparatus and the image forming system and a control method of reading control will be described below. Here, operations are described in which the characteristics on reading is determined depending on the intended use of the read image in the image forming apparatus, the reading apparatus, and the control method of reading control.

In the following description of operation, a description will be made in the case that the output object reading section 190 is installed in the image forming apparatus 100, as a specific example.

Figure 7:
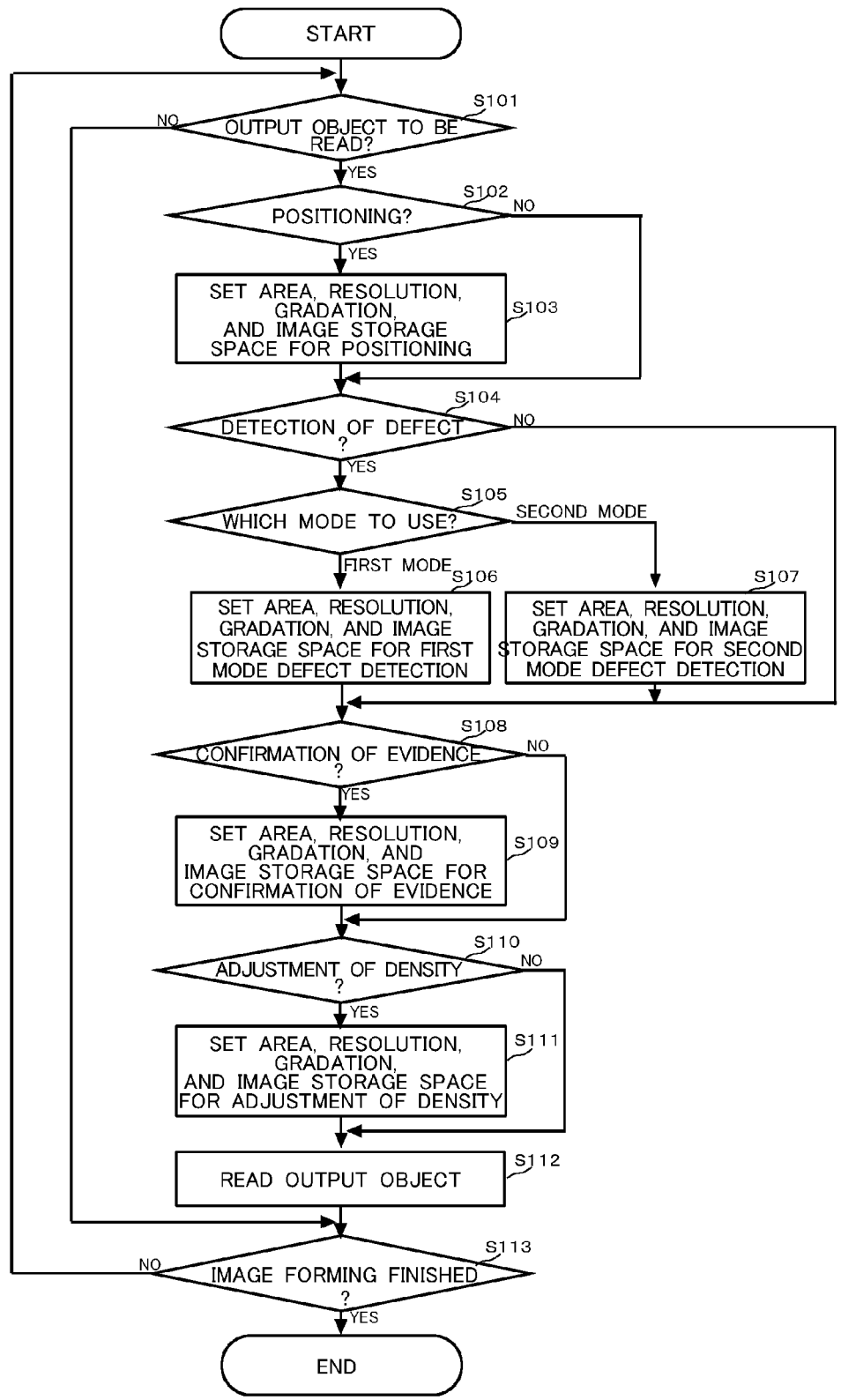
FIG. 7 is a flow chart showing an operation of an embodiment of the present invention.
Figure 8:
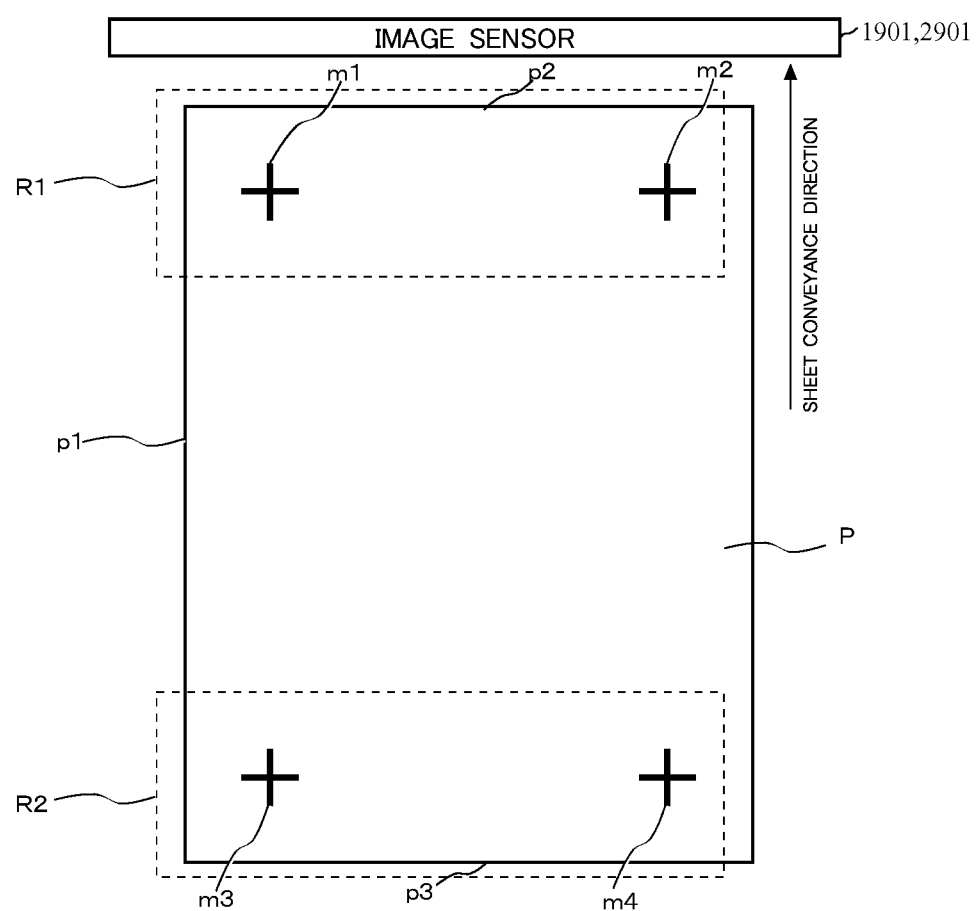
FIG. 8 is an explanatory diagram showing an embodiment of the present invention.

The control section 101 controls reading of an output object according to the flow chart of FIG. 7 at the time of forming images. Here, the output object refers to a sheet being discharged with an image formed thereon.

First, the control section 101 checks whether the settings are set to indicate that the reading of output objects is to be performed (step S101 of FIG. 7).

Here, the reading of output objects refers to any of the followings: reading for detecting a defective image by reading an image as the image for defect check; reading an image as an evidence after reading and storing the image as the image for confirming evidence (output image confirmation); reading for adjusting the image forming position by reading an image as the image for adjustment (image for positioning); and reading for the image density adjustment by reading an imager as the image for adjustment (image for density adjustment).

If the settings are not set to indicate that the reading of output objects is to be performed (step S101 of FIG. 7: No), the control section 101 repeatedly checks (step S101 of FIG. 7) whether the settings are set to indicate that the reading of output objects is to be performed, until a series of image forming according to the instruction of image forming has been finished (step S113 of FIG. 7).

If the settings are set to indicate that the reading of output objects is to be performed (step S101 of FIG. 7: YES), the control section 101 checks whether the settings of the reading output objects indicates a positioning of both side (step S102 of FIG. 7).

If the settings of the reading output objects indicate the positioning of both sides (step S102 of FIG. 7: YES), the control section 101 sets and stores a reading area, a resolution, gradation characteristics, and a storage space of image for the positioning of both sides (step S103 of FIG. 7).

For example, since a highly precise image in the vicinity of a positioning mark is necessary as the image for positioning, the resolution of 600 dpi and the gradation characteristics of 8 bits are set as high resolution and high gradation. Here, the terms "high resolution" and "high gradation" are relative expressions compared to resolutions and gradation characteristics for other intended uses, but the terms are not limited to these values.

Here, in the case of performing image positioning on the both sides of a sheet, when the positioning accuracy is 0.5 mm, the accuracy of reading a positioning mark is preferably about 0.05 mm. In this case, the resolution of 600 dpi enables the reading with the accuracy of 0.042 mm.

It is not necessary to read the whole surface to generate the image for density adjustment, only the vicinity of the positioning mark has to be read. For example, in the case that positioning marks m1 to m4 are formed on the four corners of the sheet P in FIG. 8, a partial image R1 in the vicinity of the positioning marks m1 and m2 and a partial image R2 in the vicinity of the positioning mark m3 and m4 are set as the reading areas on the both sides of the sheet P.

It should be noted that when the partial images R1 and R2 are set to include the sheet edges and the areas outside the sheet, it is possible to calculate the distances between the sheet edges and the marks m1 and m2. This arrangement enables accurate positioning of the both sides. For example, the partial area R1 includes the edge p1 and the surrounding area thereof on the outside of the sheet and the edge p2 and the surrounding area thereof on the outside of the sheet. In the same way, the partial area R2 includes the edge p1 and the surrounding area thereof on the outside of the sheet and the edge p3 and the surrounding area thereof on the outside of the sheet.

Figure 9:
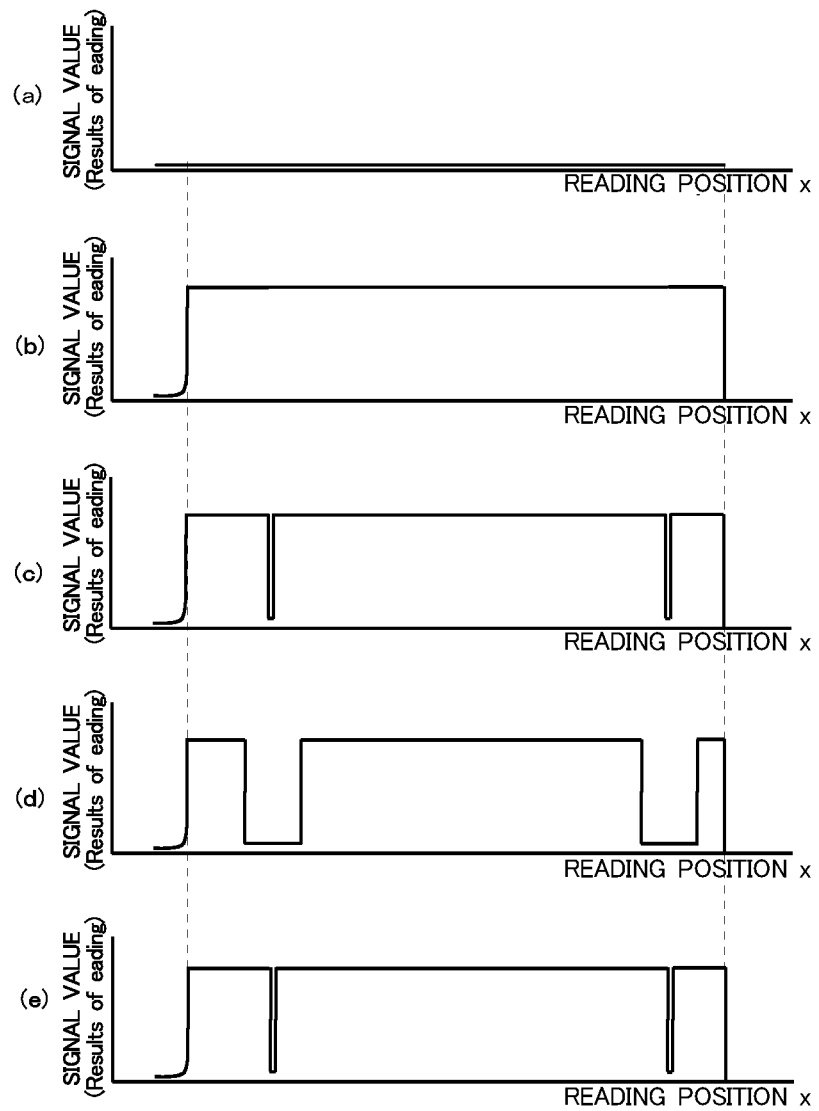
FIG. 9 is an explanatory diagram showing an embodiment of the present invention.

In this arrangement, by including the areas on the outside of the sheet the result of reading of the output object reading section 190 changes at the sheet edge such as the outside of the sheet (reflectance is low): FIG. 9(*a*) to the inside of the sheet (reflectance is high): FIG. 9(*b*). Thus, the position of the sheet edge can be detected. The results of reading, in the lateral axis and the vertical axis, of the cross shaped positioning marks m1 and m2 or m3 and m4, which are commonly called "register marks", change as shown in FIGS. 9(*c*), 9(*d*), and 9(*e*). Thus, the distance from the edge position (resolution×amount of reading) can be calculated, and the positioning of the positioning marks can be performed between the both sides of the sheet. Since this method is known, a detailed description thereof will be omitted.

Further, the control section 101 sets the storing section 104, the image data storing section 130, and the like as the storage space for the image for positioning with respect to the storage space appropriate for executing the processing of the positioning of both sides.

If the settings are set to indicate that the reading of output objects is to be performed (step S101 of FIG. 7: YES), the control section 101 checks whether the settings of the reading of output objects indicates the defective image detection (step S104 of FIG. 7).

Further, if the settings of the reading of output objects indicate the defective image detection (step S104 of FIG. 7: YES), the control section 101 checks whether the defective image detection is to be performed in a first mode or in a second mode (step S105 of FIG. 7). The first mode and the second mode represent, for example, the accuracy of the defective image detection to be performed.

Different settings of the defective image detection can be, for example: the same gradation characteristics and the different resolutions (300 dpi and 1 bit, 400 dpi and 1 bit); the same resolution and the different gradation characteristics (300 dpi and 1 bit, 300 dpi and 8 bits) in a case of a character image and a photo image. In this embodiment, as the different settings for the defective image detection, the same gradation characteristics and the different resolutions (300 dpi and 1 bit, 400 dpi and 1 bit) are used as a specific example.

If the defective image detection is performed in the first mode (step S105 of FIG. 7: "first mode"), the control section 101 sets and stores a reading area, a resolution, gradation characteristics, and a storage space of image for the first mode defective image detection (step S106 of FIG. 7). For example, for the first mode defective image detection, reading area=entire area, resolution=medium resolution (400 dpi), gradation characteristics=low gradation (binary=1 bit), and the like are set. The terms "medium resolution" and "low gradation" are relative expressions compared to the resolution and the gradation characteristics of other intended uses, and the terms are not limited to these values. The control section 101 set a storage space (for example, an external data server or the like) appropriate for performing the processing of the defective image detection as the storage space of the image for defect check for the defective image detection.

If the defective image detection is performed in the second mode (step S105 of FIG. 7: "second mode"), the control section 101 sets and stores a reading area, a resolution, gradation characteristics, and a storage space of image for the second mode defective image detection (step S107 of FIG. 7). For example, for the second mode defective image detection, reading area=entire area, resolution=medium resolution (300 dpi), gradation characteristics=low gradation (binary=1 bit), and the like are set. The control section 101 sets a storage space (for example, an external data server or the like) appropriate for performing the processing of the defective image detection as a storage space of the image for defect check for the defective image detection.

Further, if the settings are set to indicate that the reading of output objects is to be performed (step S101 of FIG. 7: YES), the control section 101 checks whether the settings of the reading output objects indicate generation of the image for confirming evidence (step S108 of FIG. 7).

If the generation of an image for confirming evidence is set (step S108 of FIG. 7: YES), the control section 101 sets and stores a reading area, a resolution, gradation characteristics, and a storage space of image for the image for confirming evidence (step S109 of FIG. 7).

For example, as the image for confirming evidence, rough images are available as far as one can be distinguished from other pages; however, the images of all pages must be stored. For this reason, in order to make data size small, the resolution of 200 dpi and the gradation characteristics of 1 bit are set as low resolution and low gradation. It should be noted that the terms "low resolution" and "low gradation" are relative expressions compared to the resolution and the gradation characteristics for other intended uses, and the terms are not limited to these values.

Further, the control section 101 set a storage space (for example, an external server for storage or the like) appropriate for storing images as a storage space for the images for confirming evidence. It should be noted that these images for confirming evidence must be surely stored with high reliability although the images may not actually be used. That is because if the images are required, the images are of essential importance.

Further, if the settings are set to indicate that the reading of output object is to be performed (step S101 of FIG. 7: YES), the control section 101 checks whether the settings of the reading output objects indicate the density adjustment (step S110 of FIG. 7).

If the settings of the reading output objects indicate the density adjustment (step S110 of FIG. 7: YES), the control section 101 sets and stores a reading area, a resolution, gradation characteristics, and a storage space of image for the density adjustment (step S111 of FIG. 7).

For example, for the image for density adjustment, the resolution of 200 dpi, gradation characteristics of 8 bits are set as low resolution and high gradation to read a plurality of density patches having certain and different sizes. Here, the terms "low resolution" and "high gradation" are relative expressions compared to the resolution and the gradation characteristics for other intended uses, and are not limited to these values.

Figure 10:
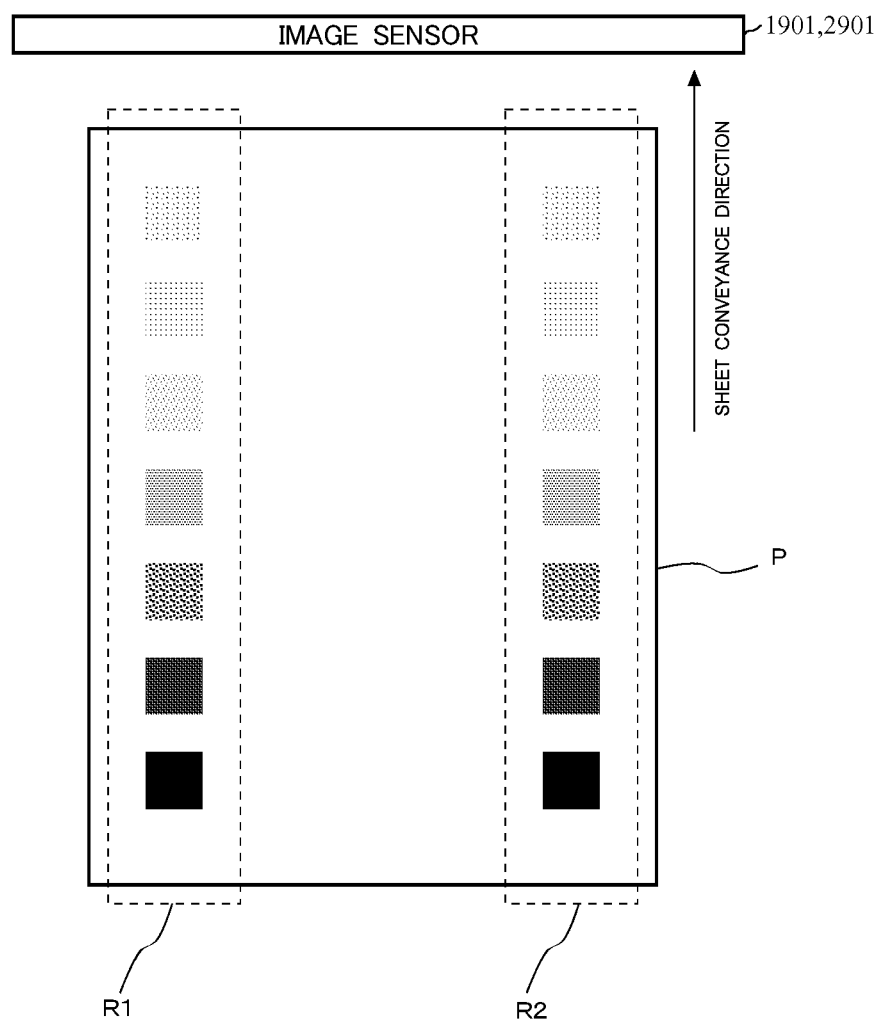
FIG. 10 is an explanatory diagram showing an embodiment of the present invention.

If it is not necessary to read the whole surface to generate the image for density adjustment, the reading only has to be done including the density patches. For example, in the case that two lines of 7 step density patches are formed on a sheet P in the sheet conveyance direction as shown in FIG. 10, a partial image R1 in the vicinity of one density patch line and a partial image R2 in the vicinity of the other density patch line are set as the reading area. Further, the control section 101 sets the storing section 104, the image data storing section 130, and the like as a storage space for the image for density adjustment with respect to a storage space appropriate for a process of the density adjustment.

Although the description was made in FIG. 10, referring to two lines of density patches for the sake of easiness, if three or more lines of density patches are formed, the reading area can be defined depending on the lines of density patches.

As described above, the control section 101 controls such that after the characteristics on reading (the resolution, the gradation characteristics, the reading area, and the storage space for the result of reading) are determined depending on the intended use of the read image, the reading of the output objects is performed by the output object reading section 190 (step S112 of FIG. 7). The determination of the characteristics on reading depending on the intended use and the reading are continued until the outputting of the output objects is finished (step S113 of FIG. 7).

In the above-described embodiment, the control section 101 determines the characteristics on reading depending on the intended use of the image to be read by the output object reading section 190. Accordingly, the image on the sheet being discharged with the image formed thereon can be read with required image quality with no waste. With this arrangement, the image forming section 150 can be adjusted with high accuracy, and data for the image confirmation can be efficiently stored in a smaller data size. In this case, besides the effect already described, the traffic on the network including the transmission of the data from the image forming apparatus 100 to the external server and the traffic to other devices are improved, and the communication time is reduced.

The output object reading section 190 can read an imager of one type with respect to a resolution, gradation characteristics, and the set area. On the other hand, when dealing with a plurality of intended uses, the output object reading section 190 can generate an image of the lower-level side (low-to-medium resolution, low gradation, and partial area) with respect to the resolution, the gradation characteristics, and the area from the image read with the higher-level settings (high resolution, high gradation, and entire area).

A description will be made in detail below with reference to FIG. 11 about the reading of the output objects when a plurality of intended uses are set in this way.

Figure 11:
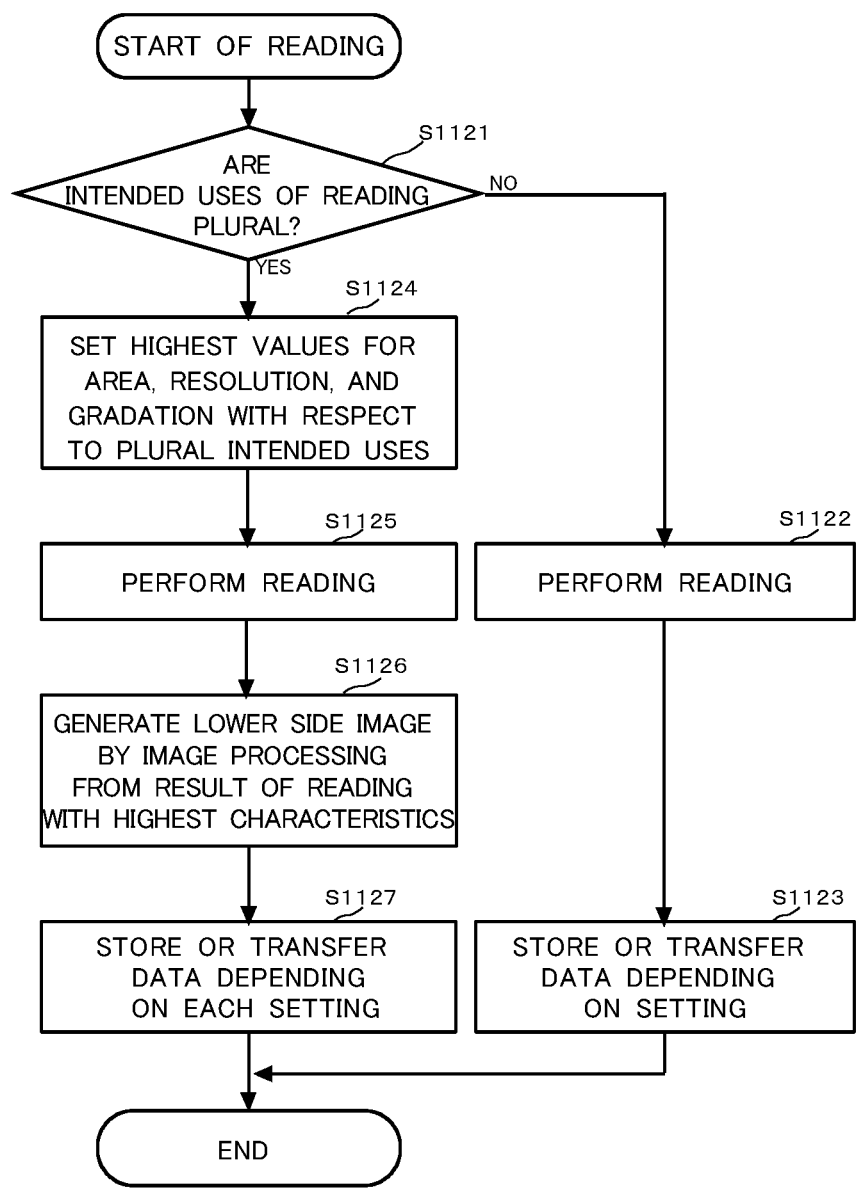
FIG. 11 is a flow chart showing an operation of an embodiment of the present invention.

The control section 101 checks, when reading the output object (step S112 of FIG. 7), whether a plurality of purposes of reading are set (step S1121 of FIG. 11).

If the intended use is single here (step S1121 of FIG. 11: NO), the control section 101 controls such that the reading is performed with the characteristics for the intended use as shown in the flow chart of FIG. 7 (step S1122 of FIG. 11), and the data are stored or transferred depending on the settings (step S1123 of FIG. 11).

Alternatively, if a plurality of intended uses are set (step S1121 of FIG. 11: YES), the control section 101 controls such that the reading is performed with the highest settings (high resolution, high gradation, and entire area) in the setting range with respect to the resolutions and the gradation characteristics for each of the plurality of intended uses (step S1124 and step S1125 of FIG. 11). Then, the control section 101 controls such that the image of the lower settings (low-to-medium resolution, low gradation, and partial area) in the setting range is generated from the read image (see step S1126 of FIG. 11 and FIGS. 5 and 6).

For example, suppose the case that in an adjustment mode of the image forming apparatus 100, two types of readings are set, one of which is the image for positioning (resolution of 600 dpi, gradation characteristics of 8 bits, and entire area) and the other of which is the image for density adjustment (resolution of 200 dpi, gradation characteristics of 8 bits, and partial area). In this case, the control section 101 can controls such that an image is read, for the positioning image, with the resolution of 600 dpi, the gradation characteristics of 8 bits, and the entire area; then, the area is limited to the partial area by the area control section 1903 or 2903, and the image for density adjustment is generated with the resolution of 200 dpi and the gradation characteristics of 8 bits by the resolution processing section 1904 or 2904.

Alternatively, suppose the case that in a normal image forming mode in the image forming apparatus 100, the image for defect check (the resolution of 300 dpi, the gradation characteristics of 1 bit, and the entire area) and the image for confirming evidence (the resolution of 200 dpi, the gradation characteristics of 1 bit, and the partial area) are both set. In this case, the control section 101 can control such that an image is read, for the image for defect check, with the resolution of 300 dpi, the gradation characteristics of 1 bit, and the entire area; then, the image is generated, for the image for confirming evidence, with the resolution of 200 dpi, the gradation characteristics of 1 bit, and the entire area by the resolution processing section 1904 or 2904.

Alternatively, suppose the case that in the normal image forming mode in the image forming apparatus 100, two types of readings are set, one of which is the image for defect check (the resolution of 400 dpi, the gradation characteristics of 1 bit, and the entire area) and the other of which is the image for confirming evidence (the resolution of 200 dpi, the gradation characteristics of 1 bit, and the partial area). In this case, the control section 101 can controls such that an image is read, for the image for defect check, with the resolution of 400 dpi, the gradation characteristics of 1 bit, and the entire area; then, the image can be generated, for confirming evidence, with the resolution of 200 dpi, the gradation characteristics of 1 bit, and the entire area by the resolution processing section 1904 or 2904.

Alternatively, suppose that two types of readings are set, one of which is the image for positioning (the resolution of 600 dpi, the gradation characteristics of 8 bit, and the entire area) and the other of which is the image for confirming evidence (the resolution of 200 dpi, the gradation characteristics of 1 bit, and the entire area. In this case, the control section 101 can control such that an image is read, for the positioning image, with the resolution of 600 dpi, the gradation characteristics of 8 bit, and the entire area; then, the image for confirming evidence is generated with the resolution of 200 dpi, the gradation characteristics of 1 bit, and the entire area by the resolution processing section 1904 or 2904 and the gradation conversion processing section 1905 or 2905.

Alternatively, suppose that two types of readings are set, on of which is the image for positioning (the resolution of 600 dpi, the gradation characteristics of 8 bits, and the entire area) and the other of which is the image for defect check (the resolution of 300 dpi, the gradation characteristics of 1 bit, and the entire area). In this case, the control section 101 controls such that an image is read, for the positioning image, with the resolution of 600 dpi, the gradation characteristics of 8 bits, and the entire area; then, the image for defect check is generated with the resolution of 300 dpi, the gradation characteristics of 1 bit, and the entire area by the resolution processing section 1904 or 2904 and the gradation conversion processing section 1905 or 2905.

Alternatively, suppose that two types of readings are set, one of which is the image for density adjustment (the resolution of 200 dpi, the gradation characteristics of 8 bits, the partial area) and the other of which is the image for confirming evidence (the resolution of 200 dpi, the gradation characteristics of 1 bit, and the entire area). In this case, the control section 101 can control such that an image is read with the higher settings, which is the resolution of 200 dpi, the gradation characteristics of 8 bits, and the entire area; then, the image for density adjustment is generated with the resolution of 200 dpi, the gradation characteristics of 8 bits, and the partial area by the area control section 1903 or 2903, and the image for confirming evidence is generated with the resolution of 200 dpi, the gradation characteristics of 1 bit, an the entire area by the gradation conversion processing section 1905 or 2905.

Alternatively, suppose that two types of readings are set, one of which is the image for density adjustment (the resolution of 200 dpi, the gradation characteristics of 8 bits, and the partial area) and the other of which is the image for defect check (the resolution of 300 dpi, the gradation characteristics of 1 bit, and the entire area). In this case, the control section 101 controls such that an image is read with the higher settings, which is the resolution of 300 dpi, the gradation characteristics of 8 bits, and the entire area; then, the image for density adjustment is generated with the resolution of 200 dpi, the gradation characteristics of 8 bits, and the partial area by the area control section 1903 or 2903, and the image for defect check is generated with the resolution of 300 dpi, the gradation characteristics of 1 bit, and the entire area by the gradation conversion processing section 1905 or 290.

In the above specific examples, described are the cases that the plurality of intended uses are two types; however, in a case of having three types or more, the control section 101 can similarly control such that an image is read according to the higher settings, and the images with lower settings are then generated by resolution conversion or gradation conversion.

After that, the images generated depending on the plurality of intended uses are stored or transferred by the storage control section 1906, depending on their settings (step S1127 of FIG. 11).

Effect Obtained by Embodiments

As described above, the control section 101 determines the characteristics on the reading of the image formed on the sheet, depending on the intended uses of the image to be read. Accordingly, the image on the sheet being discharged with the image formed thereon can be read with required image quality with no waste.

Further, the control section 101 sets the characteristics to be high resolution or high gradation when the intended use is adjusting the image forming section 150, and sets the characteristics to be low-to-medium resolution or low gradation when the intended use is the image confirmation. With this arrangement, the positioning of the image forming section 150 can be performed with high resolution and highly accurately, the density adjustment can be performed accurately with high gradation, the data for the image confirmation can be transferred and stored effectively with low-to-medium resolution and low gradation in a smaller data size. As a result, even in the case that a plurality of intended uses are set, the image on the sheet being discharged with the image formed thereon can be read with required image quality with no waste.

Further, in the case that a plurality of intended uses are set, the output object reading section 190 reads an image with the settings having higher values in the plurality of values as the characteristics, and the read image is processed to generate an image of the settings having a lower value in the plurality of values as the characteristics. Accordingly, the image on the sheet being discharged with the image formed thereon can be read with required image quality with no waste.

Alternatively, if the intended uses of the output object reading section 190 are the image confirmation and the adjustment of color or density of the image forming section 150, controls are performed to read an image with low resolution and high gradation as the characteristics, then the image for confirmation with low resolution and low gradation and the image for adjustment with low resolution and high gradation are generated from the image read with low resolution and high gradation. Accordingly, the adjustment of color or density of the image forming section 150 can be performed with high gradation, the data for the image confirmation can be stored with low resolution and low gradation in a smaller data size, and the image on the sheet being discharged with the image formed thereon can be read with required image quality with no waste.

Alternatively, if the intended uses are the mage checking and the adjustment of the image forming position of the image forming section 150, the reading section is controlled to read an image with high resolution and high gradation as the characteristics, and the image for image confirmation with low resolution and low gradation and the image for adjustment with high resolution and high gradation are generated from the image read with high resolution and high gradation. Accordingly, the image forming position adjustment of the image forming section can be performed with high resolution, and the data for the image confirmation can be stored with low resolution and low gradation in a smaller data size, as a result, the image on the sheet being discharged with the image formed thereon can be read with required image quality with no waste.

Further, the control section 101 generated an image for adjustment which is limited to a partial area from the image read by the output object reading section 190. Accordingly, the image forming position adjustment of the image forming section 150 can be performed accurately by using the image for adjustment whose data size is lowered, and the image on the sheet being discharged with the image formed thereon can be read with required image quality with no waste.

Further, the control section 101 controls the data storage or the data transmission of the image generated as described above depending on the intended use so that the image is stored in the image data storing section 130 as the image accumulation section. With this arrangement, storage and transmission can be possible in the state of a smaller data size, and the image on the sheet being discharged with the image formed thereon can be read with required image quality with no waste.

In the above description, described is a specific example in which the output object reading section 190 is installed in the image forming apparatus 100 (see FIG. 1 and FIG. 2); however, in the case that the reading apparatus 200 is installed on the rear stage of the image forming apparatus 100 (see FIG. 3 and FIG. 4), the reading is similarly performed depending on the intended use with a required accuracy with no waste as well. In this case, the output object reading section 290 reads, converts, and generates an image, depending on the intended use notified from the control section 101. In this case, after the reading is performed by the output object reading section 290 of the reading apparatus 200 depending on the intended use, the image of the result of reading is transferred to the control section 101 through the communication section 202 and the communication section 102 under the control of the transfer control section 2906 (see FIG. 6). In this case, besides the effect already described, the traffic on the network including the transmission of the data from the reading apparatus 200 to the image forming apparatus 100 and the traffic to other devices are improved, and the communication time is reduced.

Other Embodiments

The image read in the above embodiment depending on the intended use may be stored once in the image data storing section 130 or the like and then transferred to an external device such as a data server and stored therein, instead of directly stored in a storage determined depending on the intended use.

Further, if the resolution and the gradation characteristics of an image are different between the plurality of intended uses, the image is generated with the higher resolution and gradation characteristics by reading and once stored, and then the image may be generated with the lower resolution and gradation characteristics by image processing or the like.

In addition, the resolution and the gradation characteristics of an image may be changed by any method such as change of a reading cycle, change of a sheet conveyance speed during the reading, thinning, and image processing; alternatively, any plural method may be combined to generate the image with a desired resolution or gradation characteristics.

The specific values used in the embodiment such as the high resolution of 600 dpi, the low resolution of 200 dpi, the high gradation of 8 bits, and the low gradation of 1 bit are examples. For this reason, the values can be replaced with other appropriate values depending on the performances of the apparatus, the required accuracy, or the environment.

It should be noted that the image for positioning and the image for density adjustment in the above embodiments can be dealt as the image for adjustment. In this case, by dealing the image for positioning and the image for density adjustment as the image for the same intended use, the control can be simplified.

In addition, the image for defect check and the image for confirming evidence can be dealt as the image for checking. In this case, by dealing the image for defect check and the image for confirming evidence as the image for the same intended use, the control can be simplified.

The present U.S. patent application claims a priority under the Paris Convention of Japanese patent application No. 2012-281002 filed on Dec. 25, 2012, which shall be a basis of correction of an incorrect translation.

What is claimed is:

1. An image forming apparatus comprising:
an image forming section configured to form an image on a sheet;
a reading section configured to read the image formed on the sheet by the image forming section;
a control section configured to control image forming by the image forming section and reading by the reading section; and
an image accumulation section configured to store a post-process image generated from the image read by the reading section;
wherein the control section determines characteristics on the reading of the image formed on the sheet by the reading section, depending on an intended use of the image to be read by the reading section; and
wherein the control section controls to store the post-process image in the image accumulation section depending on the intended use.

2. The image forming apparatus of claim 1, wherein when the intended use is adjustment of the image forming section, the control section sets the characteristics to be high resolution or high gradation, and when the intended use is image confirmation, the control section sets the characteristics to be low-to-medium resolution or low gradation.

3. The image forming apparatus of claim 1, comprising:
a processing section configured to change resolution and gradation,
wherein when a plurality of intended uses are set, the control section controls the reading section to read the image with a setting as the characteristics which has a higher value of a plurality of values, and the control section controls the processing section to process the read image to generate the post-process image with a setting as the characteristics which has a lower value of the plurality of values.

4. The image forming apparatus of claim 1, comprising:
a processing section configured to change resolution and gradation,
wherein when the intended use is image confirmation and adjustment of color or density of the image forming section, the control section controls the reading section to read with low resolution and high gradation as the characteristics, and the control section controls the processing section to generate an image for confirmation with low resolution and low gradation and an image for adjustment with low resolution and high gradation from the image read with low resolution and high gradation.

5. The image forming apparatus claim 4, wherein the control section controls the processing section to generate an image for adjustment limited to a partial area from the image read by the reading section.

6. The image forming apparatus of claim 1, comprising:
a processing section configured to change resolution and gradation,
wherein when the intended use is image confirmation and adjustment of an image forming position of the image forming section, the control section controls the reading section to read with high resolution and high gradation as the characteristics, and the control section controls the processing section to generate an image for confirmation with low resolution and low gradation and an image for adjustment with high resolution and high gradation from the image read with high resolution and high gradation.

7. A reading apparatus connected on a downstream side of an image forming apparatus for forming an image on a sheet and configured to read the image on the sheet discharged from the image forming apparatus, the apparatus comprising:
a reading section configured to read the image formed on the sheet by the image forming apparatus,
a communication section configured to transmit to the image forming apparatus a post-process image generated from the image read by the reading section,
wherein the reading section determines characteristics on reading of the image formed on the sheet by the reading section, depending on an intended use of the image to be read,
wherein the post-process image transmitted to the image forming apparatus through the communication section is an image generated corresponding to the intended use.

8. The reading apparatus of claim 7, wherein when the intended use is adjustment of the image forming section, the reading section sets the characteristics to be high resolution or high gradation, and when the intended use is image confirmation, the reading section sets the characteristics to be low-to-medium resolution or low gradation.

9. The reading apparatus of claim 7, comprising:
a processing section configured to change resolution and gradation,
wherein when a plurality of intended uses are set, the reading section reads the image with a setting as the characteristics which has a higher value of a plurality of values, and the processing section processes the read image to generate the post-process image with a setting as the characteristics which has a lower value of the plurality of values.

10. The reading apparatus of claim 7, comprising:
a processing section configured to change resolution and gradation,
wherein when the intended use is image confirmation and adjustment of color or density of the image forming section, the reading section reads with low resolution and high gradation as the characteristics, and the processing section generates an image for confirmation with low resolution and low gradation and an image for adjustment with low resolution and high gradation from the image read with low resolution and high gradation.

11. The reading apparatus of claim 10, wherein the processing section generates an image for adjustment limited to a partial area from the image read by the reading section.

12. The reading apparatus of claim 7, comprising:
a processing section configured to change resolution and gradation,
wherein when the intended use is image confirmation and adjustment of an image forming position of the image forming section, the reading section reads with high resolution and high gradation as the characteristics, and the processing section generates an image for confirmation with low resolution and low gradation and an image for adjustment with high resolution and high gradation from the image read with high resolution and high gradation.

13. A control method of reading an image on a sheet discharged from an image forming section in an image forming system, wherein the image forming system includes: the image forming section configured to form the image on the sheet; a reading section configured to read the image formed on the sheet by the image forming section; and a control section configured to control image forming by the image forming section and reading by the reading section, the control method comprising:
operating the control section to determine characteristics when reading the image formed on the sheet by the reading section, depending on an intended use of the image to be read; and
operating the control section to store a post-process image generated from the image to be read corresponding to the intended use.

14. The method of claim 13, wherein the characteristics on the reading of the image by the reading section are determined by the control section such that:
when the intended use is adjustment of the image forming section, the characteristics are set to be high resolution or high gradation; and
when the intended use is image confirmation, the characteristics are set to be low-to-medium resolution or low gradation.

15. The method of claim 13, wherein a processing section for changing resolution and gradation is provided in the image forming system, and wherein the processing section is controlled by the control section so that when a plurality of intended uses are set, the reading section is controlled by the control section to read the image with a setting as the characteristics which has a higher value of a plurality of values, and to process the read image to generate the post-process image with a setting as the characteristics which has a lower value of the plurality of values.

16. The method of claim 13, wherein a processing section for changing resolution and gradation is provided in the image forming system, and wherein when the intended use is image confirmation and adjustment of color or density of the image forming section, the reading section is controlled by the control section to read with low resolution and high gradation as the characteristics, and the processing section is controlled by the control section to generate an image for confirmation with low resolution and low gradation and an image for adjustment with low resolution and high gradation from the image read with low resolution and high gradation.

17. The method of claim 16, wherein the processing section is controlled by the control section to generate an image for adjustment limited to a partial area from the read image.

18. The method of claim 13, wherein the image forming system comprises a processing section configured to change resolution and gradation, and wherein the intended use is image confirmation and adjustment of an image forming position of the image forming section, the reading section is controlled by the control section to read with high resolution and high gradation as the characteristics, and the processing section is controlled by the control section to generate an image for confirmation with low resolution and low gradation and an image for adjustment with high resolution and high gradation from the image read with high resolution and high gradation.

* * * * *